United States Patent
Bhaskar et al.

(10) Patent No.: US 7,033,501 B1
(45) Date of Patent: Apr. 25, 2006

(54) CENTRIFUGE APPARATUS AND METHOD WITH IMPROVED TEMPERATURE CONTROL

(75) Inventors: Gautam Bhaskar, Holywell (GB); Glenn A. Joergensen, Allerod (DK)

(73) Assignee: Bristol-Myers Squibb Company, New York, NY (US)

( * ) Notice: Subject to any disclaimer, the term of this patent is extended or adjusted under 35 U.S.C. 154(b) by 828 days.

(21) Appl. No.: 09/661,971

(22) Filed: Sep. 14, 2000

Related U.S. Application Data

(60) Provisional application No. 60/155,639, filed on Sep. 24, 1999.

(51) Int. Cl.
*B04B 3/00* (2006.01)

(52) U.S. Cl. ............... 210/360.1; 210/781; 210/782; 210/748; 210/742; 210/149; 494/43

(58) Field of Classification Search ............... None
See application file for complete search history.

(56) References Cited

U.S. PATENT DOCUMENTS

| | | | |
|---|---|---|---|
| 4,330,177 A | * | 5/1982 | Miller |
| 5,073,012 A | * | 12/1991 | Lynam |
| 5,552,671 A | * | 9/1996 | Parham |
| 5,593,823 A | * | 1/1997 | Wollowitz et al. |
| 5,603,845 A | * | 2/1997 | Holm |

FOREIGN PATENT DOCUMENTS

WO    WO 98/30304    * 7/1998

\* cited by examiner

*Primary Examiner*—W. L. Walker
*Assistant Examiner*—K S Menon
(74) *Attorney, Agent, or Firm*—John M. Kilcoyne

(57) ABSTRACT

An apparatus is adapted to centrifuge a container for separating a component, such as fibrin monomer, from blood or plasma. The container includes a cylindrical member, and a piston displaceable therein and a tubular piston rod, which extends through a top wall of the cylindrical member. The piston divides the cylindrical member into a first chamber positioned above the piston between the piston and the top wall, and a second chamber positioned below the piston. The apparatus includes a supporting turntable which releasably retains the cylindrical member. The supporting turntable is connected to a first activator for rotating the supporting turntable with the container about the central axis thereof. The apparatus also includes a rotatably journalled piston activating mechanism adapted to activate the piston by a second activator. A heat-emitting device is provided opposite the cylindrical member, and an filter is provided between the heat-emitting device and the cylindrical member to block radiation emitted by the heat-emitting device that degrades protein in the blood or plasma.

12 Claims, 1 Drawing Sheet

CENTRIFUGE APPARATUS AND METHOD WITH IMPROVED TEMPERATURE CONTROL

This application claims the benefit of provisional application No. 60/155,639 filed Oct. 24, 1999.

BACKGROUND OF THE INVENTION

1. Field of the Invention

The invention relates to an improved apparatus and method for centrifuging and monitoring/controlling the temperature of a liquid, e.g., blood or plasma, within a rotating centrifuge container without degradation of components of the liquid.

2. Description of the Related Art

U.S. Pat. No. 5,603,845, discloses a method and a container for separating a component, such as fibrin monomer, from blood or plasma by centrifugation. Blood is fed to a first annular chamber in the device. The annular chamber is defined by a cylindrical outer wall and a cylindrical inner wall, both walls extending coaxially about a common axis, as well as by a top wall and a bottom wall. The top wall is formed by a piston body displaceable within the first chamber. The method described in U.S. Pat. No. 5,603,845 involves a centrifugation of the device about the common axis to substantially separate blood into a cell fraction and a plasma fraction, followed by the resulting plasma fraction being transferred while influenced by the piston body to a second chamber defined by the outer cylindrical wall. The disclosure of U.S. Pat. No. 5,603,845 is incorporated herein by reference. See, also WO 96/16713, WO 96/16714 and WO 96/16715, the disclosure of which are also incorporated herein by reference.

In U.S. Pat. No. 5,603,845, the outer cylindrical wall extends coaxially with the common axis, whereby a fraction with fibrin monomer is caused to be separated in the second chamber while a suitable enzyme is being added. The separation of fibrin monomer from the plasma fraction in the second chamber is carried out during continued centrifugation whereby a polymerized fibrin is deposited on the cylindrical outer wall of the second chamber, whereafter the fluid fraction collected at the bottom of the second chamber is transferred while influenced by the piston body to the first chamber. The fraction with polymerized fibrin deposited on the cylindrical wall in the second chamber is caused to be dissolved by addition of a solvent and by centrifugation. The dissolved fraction is then transferred to a receiving container placed within the piston rod after enzyme capture and filtration, whereby a fibrin monomer-containing solution is provided.

U.S. Pat. No. 5,603,845 also discloses an apparatus for initialing such a centrifuging. The apparatus includes a housing which is basically divided into three compartments, i.e., an upper compartment, a central compartment, and a lower compartment. The container with the fluid to be separated is placed in the central compartment. Specifically, the container is placed on a rotatable supporting turntable which is rotatably journalled on a journalling shaft, the shaft constituting an output shaft of a motor which is housed in the lower compartment. The motor generates high rotational speed at which the container is rotated about its central axis at a number of process steps. The latter process steps correspond to the separating process which the fluid is to be subjected to whereby it is separated into the desired fluid components. The container is retained on the supporting turntable by a gripper device which engages openings along the lower rim of the container. A motor is arranged in the upper compartment. The motor cooperates with another gripper device which is rotatably journalled and adapted to be vertically displaced so as to engage and cooperate with the piston rod of the container.

EP 592242 describes a novel fibrin sealant method according to which fibrin monomer is prepared and utilized, the fibrin monomer being understood to refer to fibrin I. The monomer can be prepared using apparatus and methods as described in the aforementioned U.S. patent and international publication (U.S. Pat. No. 5,603,845, WO 96/16713, WO 96/16714 and WO 96/16715). Essentially, plasma fibrinogen is subjected to an enzyme which catalyzes the cleavage of fibrinopeptide A and/or B from fibrinogen, i.e., thrombin or a thrombin-like enzyme which converts fibrinogen to fibrin. Nondynamic fibrin monomer compositions can thereafter be obtained by, for example, solubilizing the resulting non-crosslinked fibrin polymer using a low pH, i.e., about pH 4, buffer where the fibrin monomer is prevented from polymerizing until the pH is raised.

WO 98/30304, the disclosure of which is also herein incorporated by reference, discloses a method and centrifuge apparatus of the type described above for separating a component, such as a fibrin monomer, from blood or plasma by centrifugation, to produce, for example, a fibrin sealant. The apparatus is provided with a heat emitting device for controlling the temperature of the blood or plasma and, particularly, for heating the blood or plasma to about 37° C. prior to and during processing with thrombin or thrombin-like enzyme. In preferred embodiments of WO 98/30304, the blood is preheated at relatively low rational speeds while being subjected to a heat source which radiates energy in the visible light range. The temperature of the blood is sensed indirectly using a formula and by measuring the temperature of the air and the temperature of the surface of the blood container. The temperature of the blood determined in this manner is fed to a control unit which controls the heat source.

It has been discovered, however, that heating of the blood or plasma may cause degradation of certain proteins. It would be advantageous to be able to heat the blood or plasma in a process such as disclosed in WO 98/30304, but avoid any concomitant protein degradation.

SUMMARY OF THE INVENTION

Accordingly, it is an object of the invention to provide an apparatus and method for improved separation of a component, such as fibrin monomer, from blood or plasma by centrifugation, whereby degradation of protein is avoided.

This objective and other objectives are achieved by providing an apparatus for centrifuging blood or plasma to separate a component therefrom, the apparatus comprising a container for holding the blood or plasma during the centrifuging, a means for rotating the container and a heat-emitting device. The blood or plasma in the container is heated by radiation from the heat-emitting device to increase the temperature of the blood or plasma. A filter is provided between the heat emitting device and the container for filtering the radiation from the heat emitting device to remove substantially all radiation therefrom having a wavelength in the range of from 190 to 400 mm.

There is also provided a method for converting fibrinogen contained in a sample of blood or plasma to fibrin without degrading proteins contained in the sample. A sample of blood or plasma is heated to 36 to 37° C., preferably 36° C., with radiation from a heat-emitting device, the radiation being filtered to remove therefrom substantially all radiation having a wavelength in the range of from 190 to 400 nm. The sample is subjected to an enzyme for catalyzing the cleavage of fibrinopeptides A and/or B from fibrinogen in the blood or plasma.

There is also provided a method for centrifuging blood or plasma to separate a component therefrom also without degradation of protein contained in the blood or plasma. This method includes the steps of heating the blood or plasma to 36 to 37° C., preferably 36° C., with radiation from a heat-emitting device, filtering the radiation emitted by the heat-emitting device to remove substantially all radiation therefrom having a wavelength in the range of from about 190 to 400 nm, and centrifuging the blood or plasma.

BRIEF DESCRIPTION OF THE DRAWING

Other features and advantages of the present invention will become apparent when the following description is read in conjunction with the accompanying drawing, in which:

The FIGURE is a diagrammatic front view of the apparatus according to the present invention for the separation of components of a liquid.

DETAILED DESCRIPTION OF THE PREFERRED EMBODIMENTS

Figure 1:
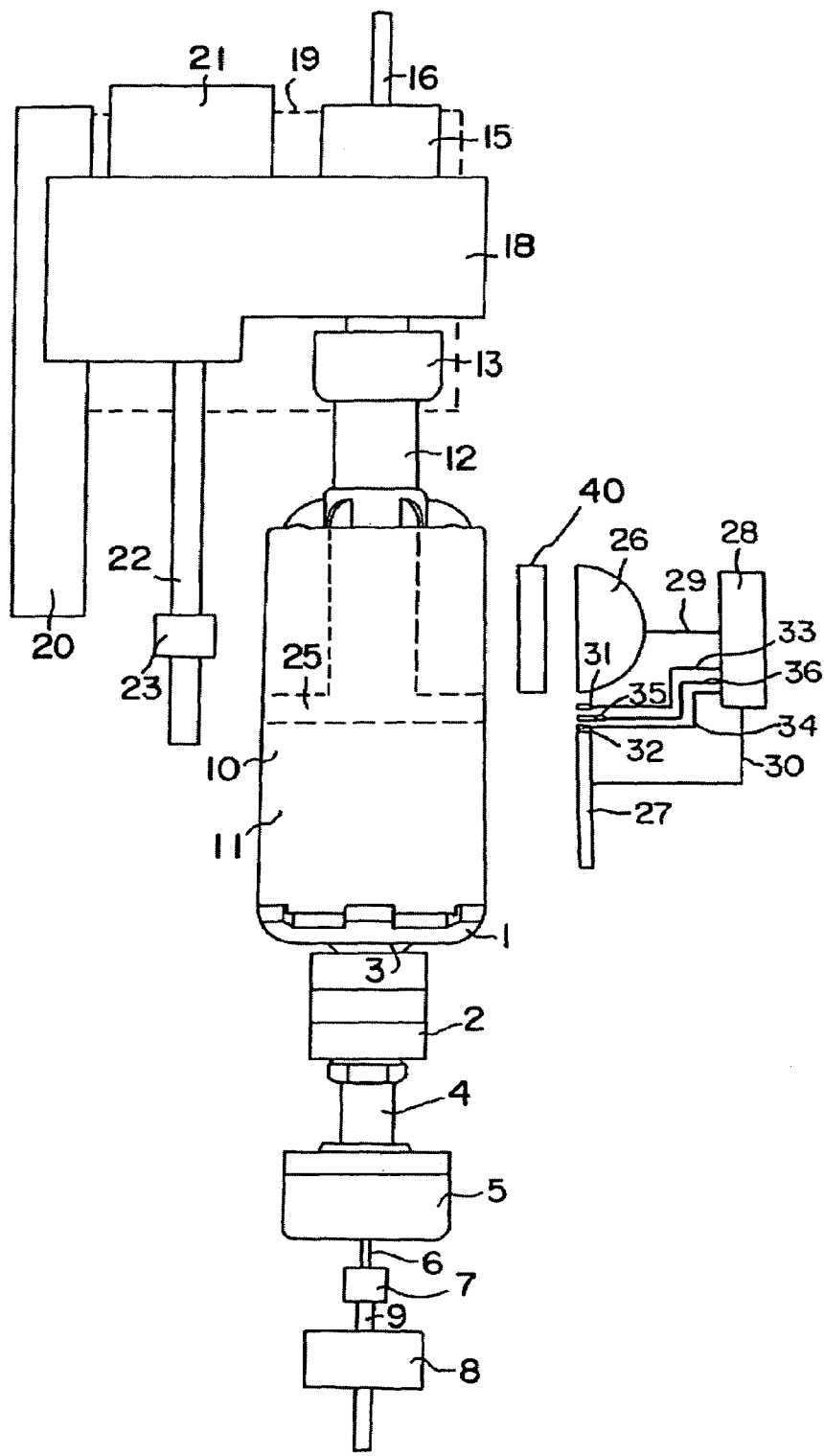

In accordance with the present invention, an enhanced centrifuge system with improved capabilities of monitoring and controlling the temperature of a liquid, e.g., blood, during centrifugation without protein degradation, is provided. As described in WO 98/30304, subjecting plasma fibrinogen to an enzyme which catalyzes the cleavage of fibrinopeptides A and/or B from fibrinogen, i.e., a thrombin or thrombin-like enzyme which converts fibrinogen to fibrin, at a temperature of about 37° C., causes the cleavage to proceed more efficiently. Careful temperature control is important since temperatures too low will not provide the enhanced effect and temperatures exceeding 40° C. can damage the blood component and cells.

As is well known in the art, the release of fibrinopeptide B is a cascade process and is dependent on several plasma proteins. While not wishing to be bound by theory, several proteins may be degraded by radiation emitted from a heating source used to warm the blood or plasma during centrifuging, the key ones being fibrinogen and prothrombin. According to the present invention, a heat-emitting device including a first heating source for emission of visible light is substantially directed towards the blood-containing portion, or first chamber, of the centrifuge container, and a filter is provided between the heat source and the container. The filter blocks radiation emitting from the heat source responsible for degradation of plasma proteins. Correspondingly, the wall of the centrifuge container is chosen to be of a visible light transmissive material so that the heat is transferred effectively to the blood with minimal excess heat absorption by the container itself. Medical grade plastics such as polycarbonate are preferred. The resulting utilization of the energy release from the heat-emitting device through the wall to the blood is thus optimal.

Furthermore, as described in WO 98/30304, the heat-emitting device may according to the invention optionally comprise a second heating source for emission of infrared radiation substantially directed towards a second chamber in the container into which a fraction of the blood will be subsequently transferred for further processing at the desired temperature. In this manner it is possible to keep the container wall absorbing the infrared radiation at a desired temperature. As also described in WO 98/30304, the heat-emitting device is preferably associated with a first temperature sensor for detecting the temperature of the air in the area around the container to be handled, as well as with a second temperature sensor for detecting the temperature of the container surface. A control unit is provided for controlling the heat-emitting device in response to the detected temperatures. The control unit may be adapted to successively activate the first and the second heating source in response to the part of the container running the separating process.

The first heating source is preferably a halogen bulb, and the second heating source is preferably a metal heating plate.

Referring now to the FIGURE, the apparatus in accordance with the present invention includes a supporting turntable 1 which is rotatably journalled in a housing (not shown) by means of a ball bearing 2. Turntable 1 is formed integral with vertical drive shaft 3. Drive shaft 3 is connected through coupling 4 to motor 5 causing the supporting turntable to follow a rotating movement about a vertical axis of rotation. Activating bar 6 is rotatably journalled coaxially with the axis of rotation inside drive shaft 3 of supporting turntable 1, activating bar 6 being connected through coupling 7 with spindle motor 8 through a spindle 9 in such a manner that when spindle motor 8 is activated, activating bar 6 can be displaced vertically upwardly or downwardly for releasable retaining container 10 on supporting turntable 1.

Container 10 is arranged on top of supporting turntable 1, container 10 being of the type described in U.S. Pat. Nos. 5,603,845, 5,738,784, and WO 96/16713. The disclosure of U.S. Pat. No. 5,738,784 is incorporated herein by reference. Container 10 comprises cylindrical member 11 and piston 25 shown by dotted lines. Piston 25 is driven by a tubular piston rod 12 projecting upwardly from the upper end of container 10. Piston rod 12 is activated by gripper 13, which in turn is activated by spindle motor 15 through spindle 16 and an activating bar (not shown) connected thereto. Gripper 13 is furthermore rotatably journalled in housing 18 through a ball bearing (now shown). Housing 18 and spindle motor 15 are secured to a common carrier indicated by dotted lines at the reference numeral 19. Carrier 19 is displaceably mounted on rail 20 and caused to be vertically displaced thereon by motor 21. Motor 21 co-operates through ball spindle 22 with ball nut 23 secured in the apparatus in such a manner that rotation of ball spindle 22 by motor 21 causes movement of carrier 19 and consequently of gripper 13 along slide 20.

As described in WO 98/30304, the apparatus of the FIGURE is used in such a manner that the container with its content is subjected to a heat source, preferably halogen bulb 26, arranged substantially opposite the area above piston 25, halogen bulb 26 being adapted to subject this portion of the container 10 to visible light. In a similar manner, heating plate 27 is arranged substantially opposite the area below piston 25 whereby it subjects this portion of container 10 to infrared radiation. Heating plate 27 can optionally be curved in such a manner that it substantially presents a curvature mating the outer periphery of container 10. Both halogen bulb 26 and heating plate 27 are connected to a control unit 28 through conduits 29 and 30, respectively. Control unit 28 is also connected to temperature sensor 31 and optional temperature sensor 32 through conduits 33 and 34, respectively. Temperature sensor 31 is adapted to measure the temperature on the surface of the portion of container 10 above piston 25 while temperature sensor 32 is adapted to measure the temperature on the surface of the portion of container 10 below piston 25, and these sensors 31, 32 can be, e.g., infrared sensors. In addition, sensor 35 is provided for measuring the temperature of the air around the container 10. Temperature sensor 35 is connected to control unit 28 through conduit 36. Both halogen bulb 26 and heating plate 27 are controlled by control unit 28 in such a manner that as far as it is possible, the blood and the components thereof contained in container 10 are kept at a temperature of 37° C. while inside the apparatus.

As also described in WO 98/30304, there are several difficulties in accomplishing this. First, the heating element, i.e., halogen bulb 26, is not in direct contact with the blood to be heated and neither are any of the temperature sensors. Also, the blood is contained within a plastic container which must be taken into account. Further, in many processes using such apparatus the container with blood is spinning, i.e., being rotated. All of these factors need to be considered since in such a rotating container it is extremely difficult to position temperature probes directly into the blood.

In order to address these factors, the temperature of the blood can be arrived at by indirectly measuring the temperature of the surface of the container and the temperature of the surrounding air using the formula described in WO 98/30304, namely:

$$T_{blood} = AT_{air} + BT_{surface}$$

where $T_{blood}$ is the temperature of the blood, $T_{surface}$ is the temperature on the surface of the container wall 37, and $T_{air}$ is the temperature of the surrounding air, and A and B are coefficients which are functions of the heat transfer coefficient of the air and the surface of the container, respectively, which depend partially on the rate of rotation of the container 10.

Coefficients A and B can be obtained experimentally, as described in WO 98/30304, with a series of trial runs for a given process by experimentally measuring the value of $T_{blood}$, $T_{air}$ and $T_{surface}$. $T_{blood}$ can be measured experimentally by stopping the process and taking direct temperature readings or by using a commercially available "heat pill", i.e., a small temperature sensitive capsule which can be placed into the blood during heating for remote readings. These coefficients can also be obtained theoretically using known equations by taking into account the energy flowing from the container to the air, the energy flowing from the inside of the wall of the container to the outside surface of the wall, and the energy flowing from the liquid (blood) to the container wall, assuming a steady state where all energy is transferred by the container wall and the air. In theoretical calculations, the heat transfer coefficient of the air depends of the rotational speed of the container in a directly proportioned manner.

In practice, the coefficients A and B increase with higher rotational speeds. Higher coefficients are believed to make the above formula less sensitive and less accurate, therefore lower rotational speeds, for example, 500–2500 RPM, have been found useful for preheating blood (about 100–150 ml) in a cylindrical centrifuge contained for processing. Preferably, the speed during initial heating and temperature stabilization is about 1000 RPM. These speeds are useful in that they keep the coefficient values for A and B lower and yet provide a gentle mixing of the blood and movement of the outside air for more uniform heating.

As mentioned above, the halogen bulb has been chosen because it emits an essentially visible light, the energy of which passes substantially freely through the wall of container 10 and directly into the blood portion or plasma without having undue amounts of heat energy absorbed by the material of the container wall.

An optional heating plate 27 emitting an infrared light may be utilized for heating the portion of container 10 below piston 25 because the energy of infrared light is absorbed in the material of the wall of container 10. Such a choice of light is the most advantageous choice for this portion of the container 10 because a relatively small amount of liquid is present inside container 10 in this portion. Therefore, heating plate 27 is solely controlled by measuring of the surface temperature of the container wall at this portion of container 11. This temperature is, as mentioned, measured by the temperature sensor 32.

In use, halogen bulb 26 is initially activated, and this activation continues as long as the blood portion positioned above piston 25 is subjected to centrifuging, and the desired separated component is transferred from this position to the area below piston 25 by way of an actuation of piston 25 through the piston rod 12, as described in U.S. Pat. Nos. 5,603,845 and 5,738,784. Subsequently, halogen bulb 26 is turned off and actuates thereby heating plate 27 so as to heat the lowermost portion of the container 10 during the continued step of the separation procedure.

It will be appreciated that, for instance, it is possible to use other heating sources emitting the desired light beams instead of the above described heating sources, i.e., the halogen bulb 26 and the heating plate 27. Furthermore, only one heating source can, if desired, be used for covering the entire container provided the heating source emits light beams of both types. Also, the above constants A and B have been calculated in consideration of the visible light from the halogen bulb passing almost freely through the wall of container 10, which is the case when the container wall is made of polycarbonate, as is usually done. When the container is made of another plastic material, it may be necessary to adjust the coefficients in question in response thereto, the coefficients being found by way of practical tests as described herein, as would be apparent to one skilled in the art.

The inventors have discovered that while heating the blood or plasma in the manner described in WO 98/30304 is advantageous, it can result in the degradation of blood proteins contained in the blood. In this regard, as is known to one skilled in the art, fibrinogen is a monomer that consists of three pairs of disulfide-linked polypeptide chains designated $(A\alpha)_2$, $(B\beta)_2$, $\gamma_2$. "A" and "B" represent the two small aninoterminal peptides, known as fibrinopeptide A and fibrinopeptide B, respectively. The cleavage of fibrinopeptides A from fibrinogen in the transformation of fibrinogen by thrombin results in the fibrin I compound and the subsequent cleavage of fibrinopeptides B results in the fibrin II compound. Such cleavage of fibrinopeptides A and B reduces the molecular weight of fibrinogen by an extremely small amount, about 6,000 out of 340,000 daltons, but exposes the polymerization sites. A review of the mechanism of blood coagulation and the structure of fibrinogen are presented in C. M. Jackson, Ann. Rev. Biochem., 49:765–811 (1980) and Furie et al., Cell 53:505–518 (1988). Reference may also be had to the Kirk-Othmer Encyclopedia of Chemical Technology, Third Edition, 4:1–24.

As discussed above, heat is applied to container 10 at the initial stages of the process in order to raise the temperature of the blood or plasma to about 37° C. prior to separation of plasma from the red blood cells, and halogen lamp 26 is preferably utilized to do so. Halogen lamp 26, however, may emit radiation in a wavelength range which will contact the blood or plasma in container 10 and potentially degrade key proteins therein. In general, this wavelength range is from 190 to 400 nm which generally corresponds to the ultraviolet wavelength band of the electromagnetic spectrum.

In order to avoid this potential degradation of blood proteins, filter 40 is provided between halogen lamp 26 and container 10. Filter 40 blocks all or substantially all of the radiation in the above mentioned wavelength range which are believed to be responsible for the unwanted protein degradation.

Any suitable filter may be utilized in the present invention provided it blocks all or substantially all of the radiation in the wavelength range mentioned above. For example, the 1StK.66400 044.4×3.0 mm UV filter available from Delta Light and Optics of Denmark may be used in the present invention. Such a UV filter is generally referred to as a "longpass" filter and can be identified by the Delta Light and Optics' designation "GG400" or "GG420." They are generally about 3 mm in thickness and block more than about 99% of the radiation with wavelengths below about 390 nm and between about 50% to $^{99}$% of the radiation having wavelengths between about 390 nm and 420 nm. For radiation having wavelengths above about 450 nm, the filter blocks only about 5% or less of the radiation. This allows the energy required to heat the blood from the halogen lamp to reach the blood without or substantially without allowing the deleterious UV radiation to reach the blood. Other suitable filters will be apparent to one skilled in the art.

The invention is further illustrated by the following example which is set forth by way of illustration only and not by way of limitation.

EXAMPLE

Plasma which had been freeze thawed was used for the preparation of fibrin solutions in the manner described in U.S. Pat. Nos. 5,603,845 and 5,738,784. A UV light filter was acquired with dimensions to fit in front of the lamp without any special fixtures.

Materials/Equipment
HPLC system: Waters 625 system which a $C_{18}$ column (3.9 mm by 1501 mm column) using Millenium software data handling system
UV filter: 1 StK. GG 400 Ø44.4×3.0 mm, -Delta Light and Optics (Denmark)
Stored human plasma—Danish Blood Bank
Sample buffer: 0.05M ammonium acetate at pH 6.0
Preparation of Fibrin Solutions Fibrin solutions were prepared in a paired manner from each bag of plasma. Two samples with approximately 137 ml of plasma each were prepared from the same bag. One sample was processed without the UV filter in place and the other sample was prepared with the filter in place. The fibrin I solutions were evaluated for pH, volume and concentration. The fibrin I solutions were repolymerized immediately with pH 10 buffer and incubated at 37° C. for 30 minutes. 5 ml of sample buffer was added to the sample and boiled in a water bath for 3 minutes, allowed to cool to ambient temperature, centrifuged at 3500 RPM for 10 minutes and then filtered through a 0.45 μm disc filter. The filtrate was analyzed using the HPLC system. In the HPLC analysis, the following mobile phase buffers were used: (A) 0.025 M sodium acetate at pH 6; and (B) 0.025 sodium acetate in a water/acetonitrile (1:1) mixture at pH 6. The chromatography was performed under linear gradient elution conditions and a flow rate of 1 ml/min at time zero of 85% buffer (A) and 15% buffer (B), and a flow rate at time 30 minutes of 1 ml/min of 60% buffer (A) and 40% buffer (B). The samples were also prepared such that full release of FPA/FPB was generated. This was done by adding excess thrombin to the fibrin clot following repolymerization. The sample was incubated at 37° C. for 30 minutes and treated as per above for analysis by HPLC for FPA/FPB content.

Two standards were prepared and analyzed by HPLC:
Standard (1) Mixed a solution of FPA with a solution of FPB
Standard (2): Kabi fibrinogen solution (20 mg/ml) and thrombin solution. The clot was incubated at 37° C. for 30 minutes, cooled to ambient temperature, 5 ml of sample buffer was added, boiled for 3 minutes, cooled to ambient, centrifuged at 3500 RPM for 10 minutes and filtered through a 0.45 μl disc filter. The filtrate of this solution was analyzed by HPLC for FPA/FPB content The following Table 1 is a list of samples analyzed by HPLC:

TABLE 1

| Sample No. | UV filter | Sample Description |
|---|---|---|
| 1 | no | FPA Standard |
| 2 | no | Thrombin and fibrinogen standard |
| 3 | no | Fibrin preparation |
| 4 | yes | Fibrin preparation |
| 5 | no | Fibrin preparation |
| 6 | yes | Fibrin preparation |
| 7 | no | Fibrin preparation |
| 8 | yes | Fibrin preparation |
| 9 | no | Fibrin preparation (plus thrombin) |
| 10 | yes | Fibrin preparation (plus thrombin) |
| 11 | no | Fibrin preparation (plus thrombin) |
| 12 | yes | Fibrin preparation (plus thrombin) |
| 13 | no | Fibrin preparation (plus thrombin) |
| 14 | yes | Fibrin preparation (plus thrombin) |

Results

A marked increase in FPB release was observed in samples prepared using the UV filter system compared to those prepared without the filter system. The percentage of FPB released was calculated by using the thrombin/fibrinogen standard in which full FPB release is ensured.

In the following Table 2, the % FPB is calculated as follows:

$$\% \ FPB = \frac{A}{B} \times 100$$

where A is the sum of the peak areas of des Arg B and FPB in sample solution, and B is the sum of the peak areas of des Arg B and FPB in thrombin/fibrinogen standard.

TABLE 2

| Sample No. | Peak Areas | | | % FPB | % FPB with respect to FPB standard |
|---|---|---|---|---|---|
| | d-FPB | FPB | d-FPB + FPB | | |
| 1 | 0 | 784845 | 784845 | — | — |
| 2 | 453998 | 4046380 | 4500388 | 100 | — |
| 3 (−) | 0 | 166770 | 186770 | 4.15 | 23.80 |
| 4 (+) | 398810 | 485013 | 883823 | 19.64 | 112.61 |
| 5 (−) | 68511 | 190712 | 259223 | 5.76 | 33.03 |

TABLE 2-continued

| Sample No. | Peak Areas | | | % FPB | % FPB with respect to FPB standard |
|---|---|---|---|---|---|
| | d-FPB | FPB | d-FPB + FPB | | |
| 6 (+) | 252709 | 451907 | 704616 | 15.66 | 89.78 |
| 7 (−) | 2016785 | 611809 | 2628594 | 58.41 | 334.92 |
| 8 (+) | 1693549 | 961796 | 2655345 | 59.00 | 338.33 |
| 9 (−) | 1886784 | 569687 | 2456461 | 54.58 | 312.99 |
| 10 (+) | 1438949 | 972426 | 2411375 | 53.58 | 307.24 |
| 11 (−) | 916590 | 815368 | 1731958 | 38.48 | 220.68 |
| 12 (+) | 1837600 | 862140 | 2699740 | 59.99 | 343.96 |
| 13 (−) | 2659453 | 581496 | 3240949 | 72.01 | 412.94 |
| 14 (+) | 2541429 | 782355 | 3323784 | 73.86 | 423.50 |

(+) - denotes with UV filter
(−) - denotes without UV filter

The results show that approximately a four fold increase in FPB was observed in samples prepared using the UV filter system in accordance with the present invention. Further increase was observed in all samples by the addition of exogenous thrombin indicating that the release was not complete in the samples of fibrin II clots.

The overall results show that the use of UV filter system showed a marked increase in FPB release.

Although the present invention has been described in connection with a preferred embodiment thereof many other variations and modifications and other uses will become apparent to those skilled in the art without departing from the scope of the invention. It is preferred, therefore, that the present invention not be limited by the specific disclosure herein, but only by the appended claims.

What is claimed:

1. An apparatus for centrifuging blood or plasma to separate a component therefrom without degradation of protein contained in the blood or protein, comprising:
   a container for holding the blood or plasma during the centrifuging;
   a means for rotating the container;
   a heat-emitting device provided opposite the container for radiating the blood or plasma in the container to increase the temperature of the blood or plasma; and
   a filter disposed between the heat-emitting device and the container for filtering the radiation emitted from the heat-emitting device to remove substantially all radiation therefrom having a wavelength in the range of from 190 to 400 nm.

2. The apparatus according to claim 1, wherein the container comprises a cylindrical member, a piston diplaceable therein, a top wall and a tubular piston rod extending through the top wall, the piston rod dividing the cylindrical member into a first chamber located above the piston between the piston and the top wall, and a second chamber positioned below the piston.

3. The apparatus according to claim 2, further comprising a piston activating mechanism connected to the piston for moving the piston from a first position in the cylindrical member to a second position in the cylindrical member.

4. The apparatus according to claim 1, wherein the means for rotating the container comprises a supporting turntable with means for releasably retaining the container, and a motor coupled to the supporting turntable, the motor rotating the supporting turntable and the container about a central axis thereof.

5. The apparatus according to claim 1, wherein the heat-emitting device comprises a first heating source for emitting visible light substantially directed towards the container.

6. The apparatus according to claim 5, wherein the first heating source is a halogen bulb.

7. The apparatus according to claim 5, further comprising a second heating source for emitting infrared radiation substantially directed towards the container.

8. The apparatus according to claim 7, wherein the second heating source comprises a metal heating plate.

9. The apparatus according to claim 1, further comprising a first temperature sensor for detecting the temperature of air in an area around the container, a second temperature sensor for detecting the temperature of a surface of the container, and a control unit for controlling the heat-emitting device in response to the temperatures detected in the first and second temperature sensors.

10. A method for centrifuging blood or plasma to separate a component of the blood or plasma without degradation of protein contained in the blood or plasma, comprising the steps of:
   heating the blood or plasma to about 36 to 37° C. with radiation from a heat-emitting device;
   filtering the radiation emitted from the heat-emitting device to remove substantially all radiation therefrom having a wavelength in the range of from 190 to 400 nm; and
   centrifuging the blood or plasma.

11. The method according to claim 10, wherein the sample of blood or plasma is heated to about 36° C.

12. The method according to claim 11, wherein radiation having a wavelength in the range of from 190 to 400 nm is filtered from the radiation emitted by the heat-emitting device.

* * * * *